US 6,611,258 B1

(12) United States Patent
Tanaka et al.

(10) Patent No.: US 6,611,258 B1
(45) Date of Patent: *Aug. 26, 2003

(54) INFORMATION PROCESSING APPARATUS AND ITS METHOD

(75) Inventors: Atsushi Tanaka, Yamato (JP); Yuichiro Yoshimura, Kamakura (JP); Ryozo Yanagisawa, Inzai (JP); Katsuyuki Kobayashi, Yokohama (JP); Masaki Tokioka, Fujisawa (JP); Hajime Sato, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/777,243

(22) Filed: Dec. 31, 1996

(30) Foreign Application Priority Data

Jan. 11, 1996 (JP) .............................................. 8-002791

(51) Int. Cl.⁷ ................................................. G09G 5/00
(52) U.S. Cl. ........................ 345/179; 345/173; 345/174
(58) Field of Search ................................ 345/179, 173, 345/174

(56) References Cited

U.S. PATENT DOCUMENTS

| 4,686,332 A | * | 8/1987 | Greanias et al. ............... 178/19 |
| 5,352,856 A | | 10/1994 | Tanaka et al. ................. 178/18 |
| 5,362,930 A | | 11/1994 | Yoshimura et al. ............ 178/18 |
| 5,402,151 A | * | 3/1995 | Duwaer ....................... 345/173 |
| 5,539,160 A | | 7/1996 | Tokioka et al. ................ 128/19 |

FOREIGN PATENT DOCUMENTS

| JP | 4-68392 A | * | 3/1992 | ................. 345/173 |
| JP | 5-62771 | | 9/1993 | |

* cited by examiner

Primary Examiner—Julie Lieu
(74) Attorney, Agent, or Firm—Fitzpatrick, Cella, Harper & Scinto

(57) ABSTRACT

In a pen-input computer or the like, it is impossible to distinguish an input method and to execute a proper process according to the input method. A touch panel driver generates finger-input coordinate values for a display screen. A digitizer driver generates pen-input coordinate values for the display screen. A processor receives the coordinate values and additional information indicative of either the finger-input or the pen-input from a source discriminator, starts an inputting process according to the input method, and allows a virtual keyboard to be displayed onto the screen or allows a "CHR input pad" window to be opened.

16 Claims, 7 Drawing Sheets

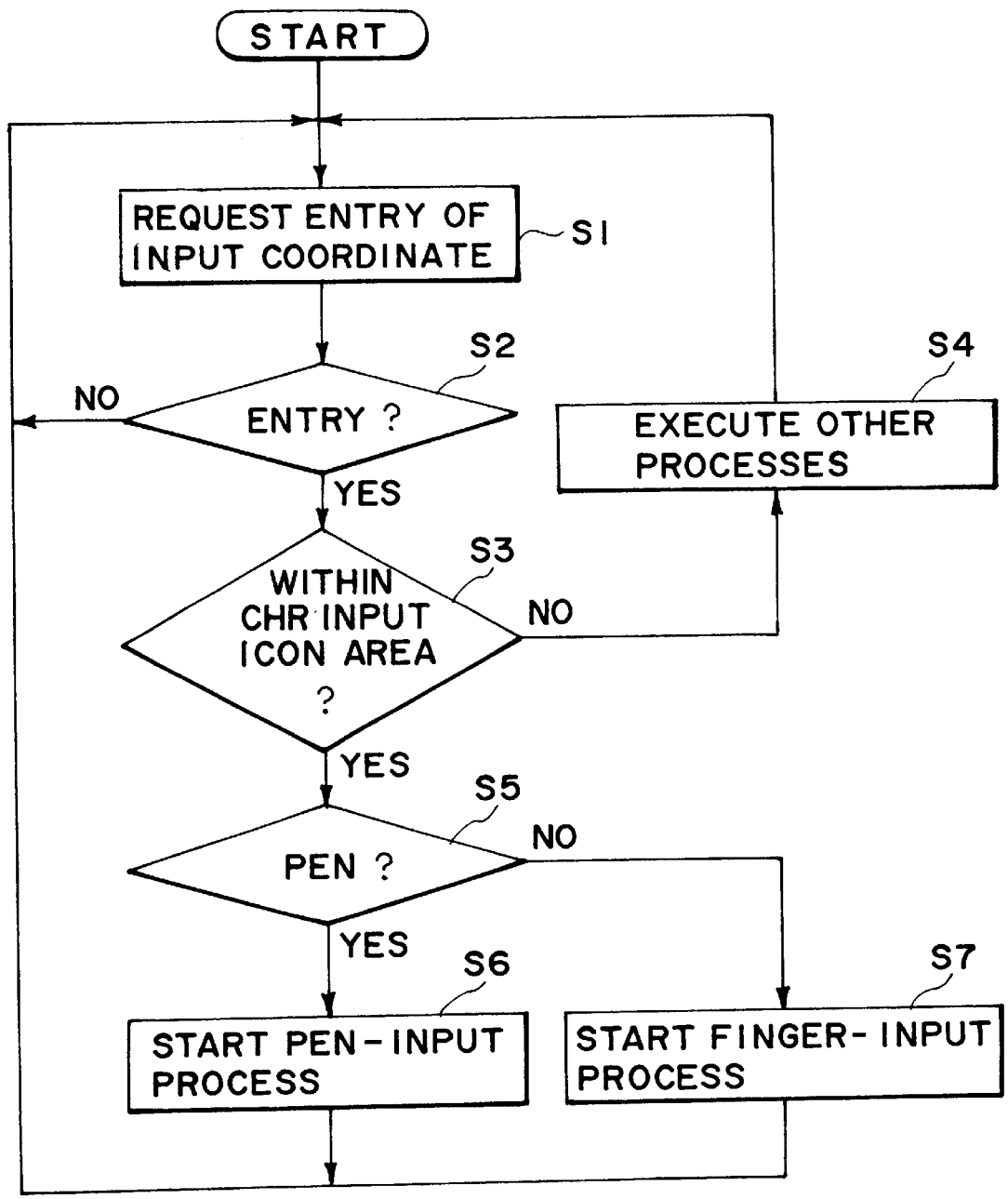
F I G. 5

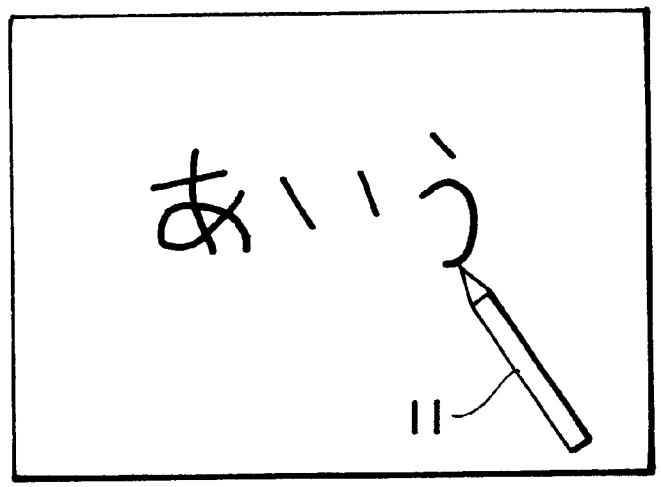
F I G. 7A
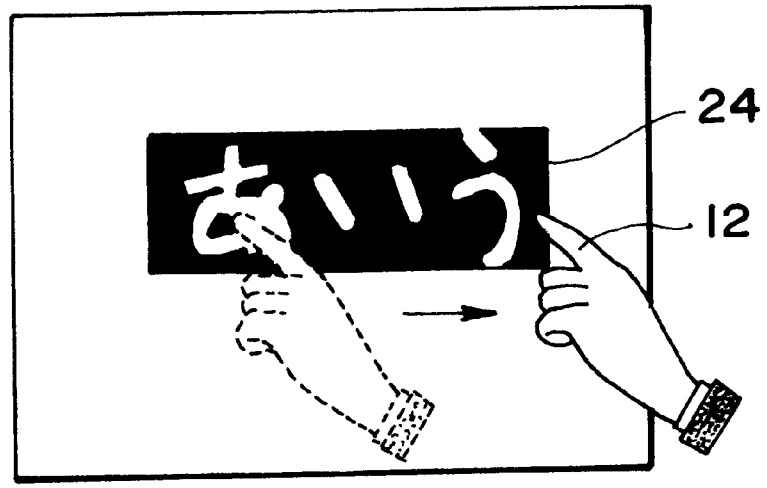
F I G. 7B

| DIRECTORY INFORMATION |
|---|
| ⋮ |
| COORDINATE INPUT MODULE |
| INPUT SOURCE DISCRIMINATION MODULE |
| PROCESS CONDITION SETTING MODULE |
| ⋮ |
| PROCESSING MODULE |
| DISPLAY SCREEN FORMING MODULE |
| ⋮ |
| ⋮ |
| |
| |

FIG. 8

INFORMATION PROCESSING APPARATUS AND ITS METHOD

BACKGROUND OF THE INVENTION

1. Field of the Invention

The invention relates to an information processing apparatus and its method and, more particularly, to an information processing apparatus and its method for executing processes in accordance with, for example, coordinates which were inputted.

2. Related Background Art

There are various kinds of pen computers in which a coordinate input apparatus is constructed on a monitor to display a computer screen and commands and data are inputted by a pen or the like. According to those computers, characters are inputted and an icon, a menu, or the like displayed on the screen are selected by using the pen and a user interface different from a conventional computer using a keyboard is provided.

As those pen computers, there is a pen computer using a touch panel of a resistive film type as coordinate input means. According to the touch panel of the resistive film type, a predetermined gap is formed between two opposite electrodes and coordinate values (hereinafter, referred to as "input coordinate values") of a position on the touch panel which was depressed by a pen, a finger, or the like is detected from a voltage dividing ratio of a voltage applied to a resistive film or the like.

However, the foregoing technique has the following problems.

In case of the touch panel of the resistive film type, when the touch panel is depressed, input coordinate values are outputted irrespective of means by which the touch panel was depressed. Namely, an entry by a pen and an entry by a finger or the like are processed in the same way. However, in order to more finely make an instruction or to provide an input apparatus of a better use efficiency, it is desirable to distinguish the entry by the pen from the entry by the finger or the like and to execute a proper operation, display, or the like in accordance with a result of the distinction.

The invention is made to solve the foregoing problems and it is an object of the invention to provide an information processing apparatus and its method which can distinguish an input method and perform a proper process according to the distinguished input method.

SUMMARY OF THE INVENTION

According to an embodiment of the invention, it is an object to provide an information processing apparatus comprising: first and second input means for inputting an instruction performed for a display screen; discriminating means for discriminating an entry by the first input means and an entry by the second input means; and processing means for setting process conditions on the basis of a discrimination result by the discriminating means and executing a process based on the instruction.

BRIEF DESCRIPTION OF THE DRAWINGS

FIG. 5 is a flowchart for explaining the operation of the embodiment;

FIG. 7A is a diagram showing another example in which an operability is improved by executing a process according to an input device;

FIG. 7B is a diagram showing another example in which an operability is improved by executing a process according to an input device; and FIG. 8 is a diagram showing an example of a memory map of a storage medium in which program codes according to the invention have been stored.

DETAILED DESCRIPTION OF THE PREFERRED EMBODIMENTS

An information processing apparatus of an embodiment according to the invention will now be described in detail hereinbelow with reference to the drawings.

Construction

Figure 1:
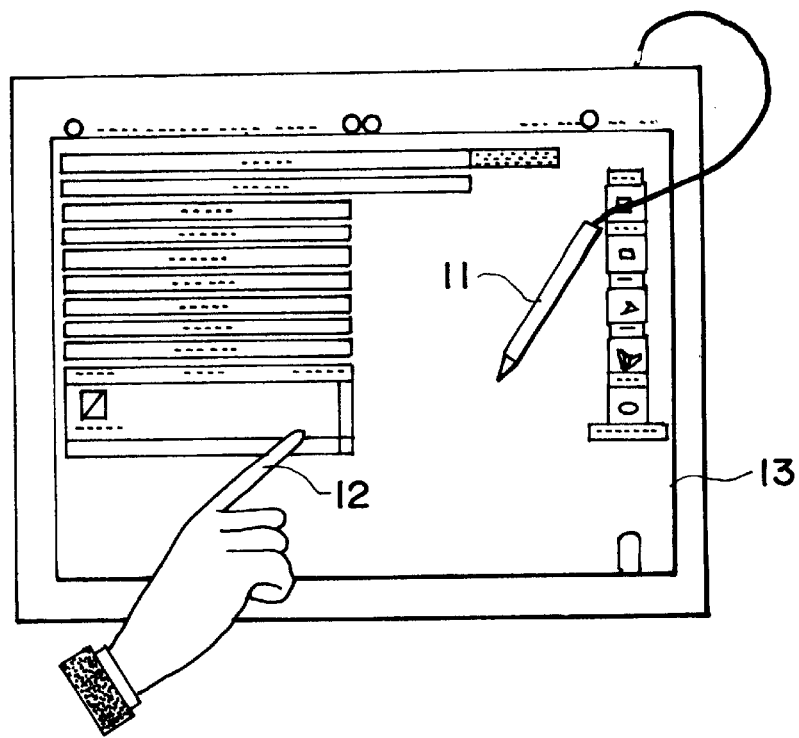
FIG. 1 is a diagram showing an outline of an information processing apparatus of an embodiment according to the invention.

FIG. 1 is a diagram showing an outline of the information processing apparatus of an embodiment according to the invention. A digitizer to which an entry can be performed by a pen 11 and a touch panel to which an entry by a finger 12 can be performed are formed on a screen 13 of a monitor to display a computer screen or the like.

As a digitizer, a digitizer of a type of using an ultrasonic wave disclosed in JP-B-5-62771 or the like is used. However, a description of its detailed operation, construction, and the like is omitted here. On the other hand, a touch panel of a resistive film type is used as a touch panel for a finger-input.

Figure 2:
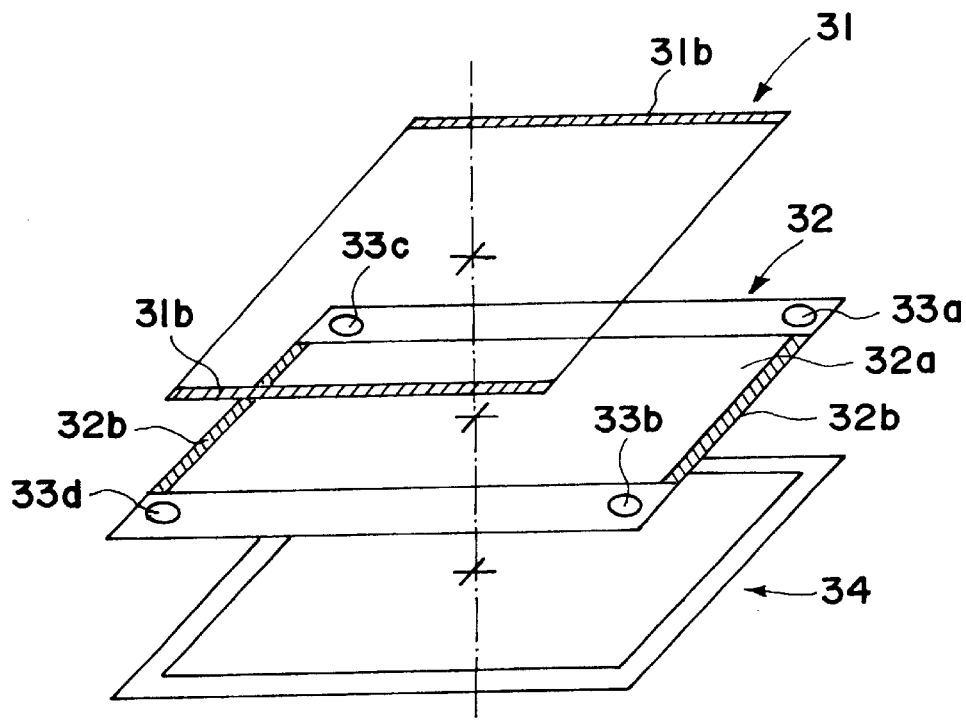
FIG. 2 is a diagram showing a constructional example of a digitizer and a touch panel according to the embodiment.

FIG. 2 is a diagram showing a constructional example of a digitizer and a touch panel according to the embodiment. Electrodes 31b for a signal input (or extraction) are formed at edge surfaces of a PET sheet 31 on which a transparent resistive film constructing the upper surface of the touch panel is formed. A glass plate 32 constructs the lower surface of the touch panel and also serves as a propagating member for an ultrasonic digitizer. A transparent electrode 32a of a predetermined resistivity for the touch panel and electrodes 32b for a signal extraction (or input) are formed on the glass plate 32. Sensors 33a, 33b, 33c, and 33d for detecting an ultrasonic wave are arranged at positions near four corners of the glass plate 32.

As mentioned above, since those input means are constructed by the PET, glass, and transparent electrode, they can be overlappingly arranged on a display apparatus 34 such as an LCD or the like and can construct an information processing apparatus in which a pen-input and a finger-input can be performed as shown in FIG. 1.

In FIG. 2, the PET sheet 31 of the upper surface and the glass plate 32 of the lower surface are adhered so as to sandwich a spacer of a predetermined thickness. When they are depressed by a finger or the like, the PET sheet 31 is warped and is come into contact with the transparent electrode 32a of the glass plate 32, so that input coordinate values can be detected from a signal which is outputted from each signal electrode at that time.

On the other hand, a vibrator pen is come into contact with the upper surface of the PET sheet 31 and a vibration is transmitted to the glass plate 32 serving as a propagating member, thereby performing the pen-input. The vibration is propagated in the glass plate 32 and reaches each sensor after the elapse of a time according to a distance from an input point. For example, the sensor such as a piezoelectric device converts a transmitted mechanical vibration to an electric signal and sends to a detecting circuit (not shown). The detecting circuit measures the time which is required until the vibration arrives at each sensor, calculates a distance between each sensor and the input point on the basis of a transmission speed and a transmission time, and outputs the input coordinate values.

Figure 3:
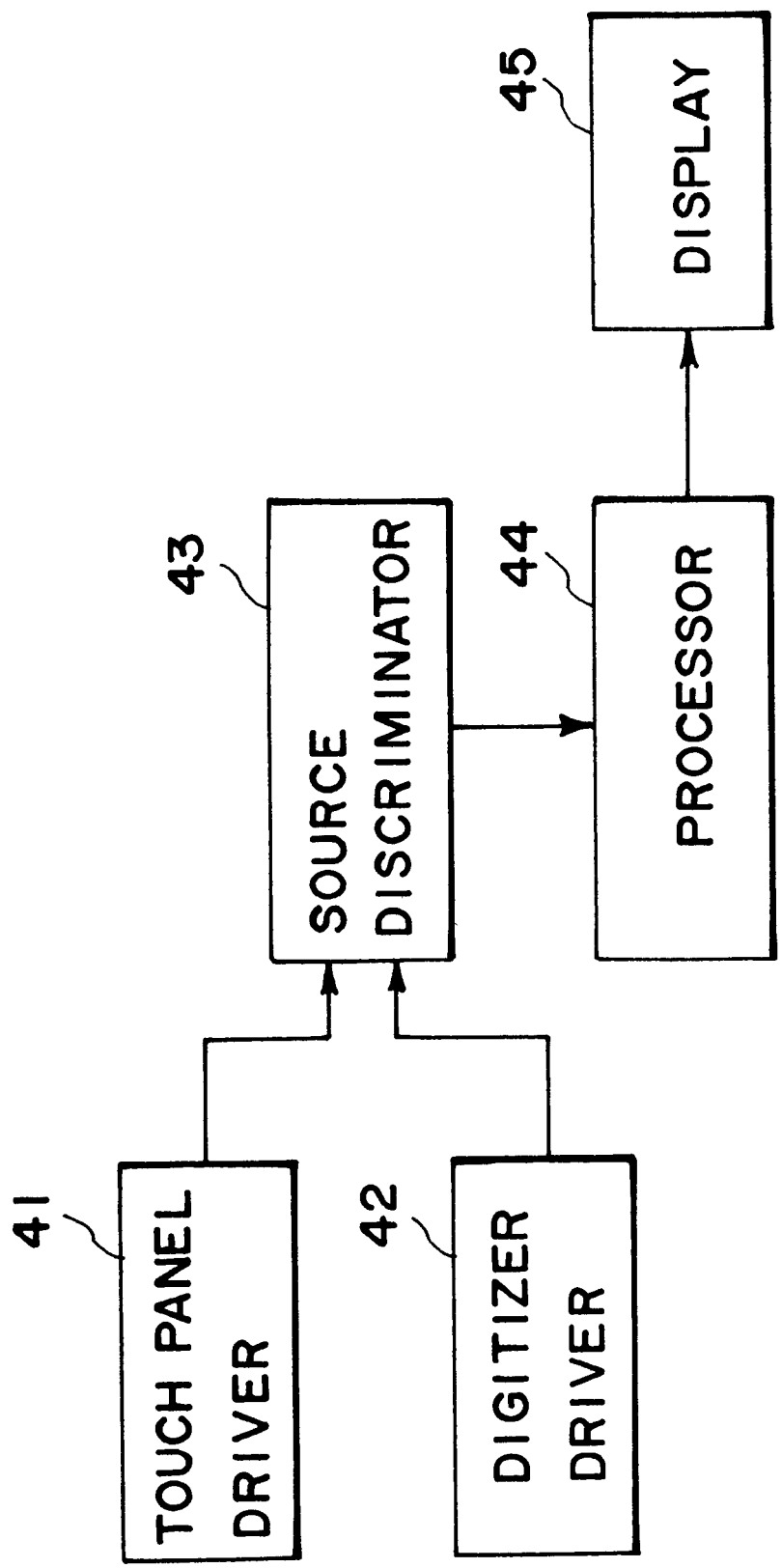
FIG. 3 is a block diagram showing a constructional diagram of the embodiment.

FIG. 3 is a block diagram showing a constructional example of the embodiment. A touch panel driver 41 executes a control regarding the touch panel and a detection of the input coordinate values. A voltage is alternately applied to the resistive film of each of X and Y axes, a divided voltage at the input point is detected, an A/D conversion is executed, and the resultant converted voltage is outputted as input coordinate values.

A digitizer driver 42 drives the vibrator pen at a predetermined period, measures a time which is required until the vibration arrives at each sensor, calculates a distance between each sensor and the input point, and outputs input coordinate values.

A source discriminator 43 receives the input coordinate values from the touch panel driver 41 and digitizer driver 42, thereby discriminating whether the entry has been performed by the pen 11 or finger 12. A processor 44 serving as a main body portion of a pen-input computer executes predetermined processes on the basis of the input coordinate values sent from the source discriminator 43 and the data indicative of either the finger-input or the pen-input, changes an image to be displayed on a display 45, and executes processes as a computer.

Namely, when only the finger-input is performed, the input coordinate values are outputted from the touch panel driver 41 and no input coordinate value is outputted from the digitizer driver 42. Therefore, the source discriminator 43 sends the input coordinate values to the processor 44 while regarding that the those values were obtained by the finger-input. On the basis of the transmitted input coordinate values and the data indicative of the finger-input, the processor 44 executes predetermined processes, changes an image to be displayed on the display 45, and executes processes as a computer.

On the other hand, when the pen-input is performed, not only the input coordinate values are outputted from the digitizer driver 42 but also the touch panel is depressed by the pen or the hand, so that the input coordinate values are also outputted from the touch panel driver 41. When the input coordinate values are inputted from both of the drivers, the source discriminator 43 supplies the input coordinate values inputted from the digitizer driver 42 to the processor 44 while regarding that those values were derived by the pen-input. On the basis of the transmitted input coordinate values and the data indicative of the pen-input, the processor 44 executes predetermined processes, changes an image to be displayed on the display 45, and executes processes as a computer.

With the above construction, whether the entry has been performed by the pen 11 or finger 12 can be discriminated and a proper operation according to the entry can be performed. Although an example in which whether the entry has been performed by the pen 11 or finger 12 is discriminated by hardware has been described above, the processor 44 can also perform such a discriminating process by software.

Input Method

Figure 4A:
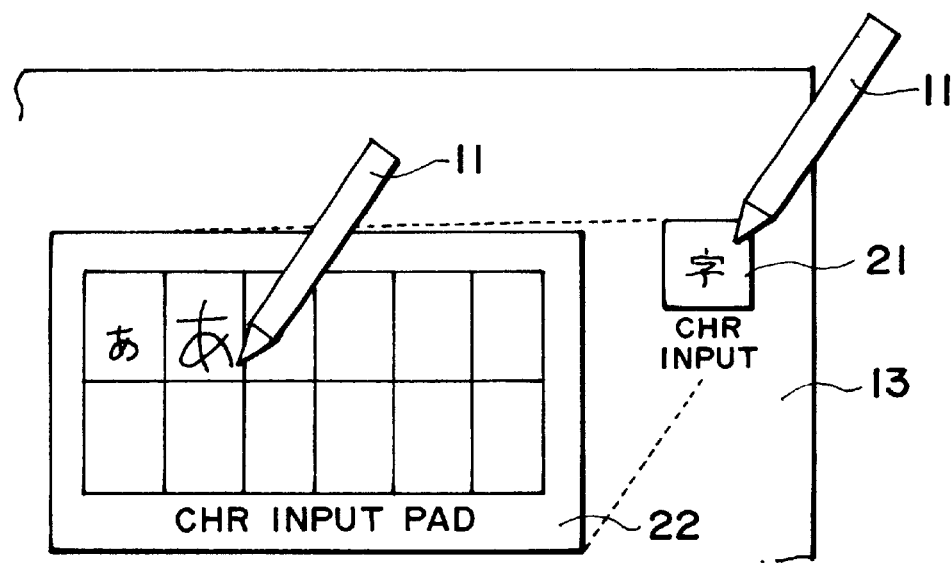
FIG. 4A is a diagram for explaining an example of a character input method.
Figure 4B:
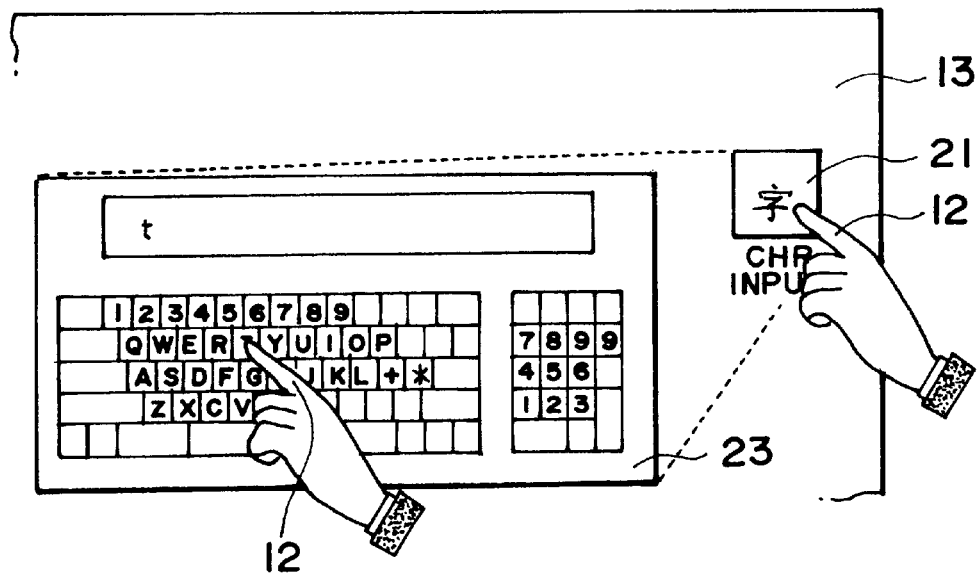
FIG. 4B is a diagram for explaining an example of a character input method.

FIGS. 4A and 4B are diagrams for explaining an example of a character input method.

For example, a character input icon 21 is displayed on the screen 13 and the icon 21 is touched by the pen 11, thereby starting a character input. When the start of the character input is instructed by the icon 21, a "CHR input pad" window 22 is opened. Namely, since the operation by the pen 11 is suitable to input a character, figure, or the like, the apparatus has been preset in a manner such that when the character input icon 21 is touched by the pen 11, the "CHR input pad" window 22 is opened. The "CHR input pad" window 22 is one of input forms of software to recognize a hand-written character. For example, when the user writes a character by the pen 11 into a small rectangular region of a lattice on the "CHR input pad" window 22, the input pattern is recognized as a character and a code corresponding to the recognized character is transmitted to an OS (operating system), various application softwares, or the like.

On the other hand, it is difficult to write a character onto the "CHR input pad" window 22 by the finger 12. Therefore, when the character input icon 21 is touched by the finger 12, a virtual keyboard 23 is opened in place of the "CHR input pad" window 22. The entry by the virtual keyboard 23 can be used in a manner similar to the ordinary keyboard by using software such as a Katakana-Kanji conversion or the like. Namely, since an input point can be easily instructed even by the finger-input, a character input is performed by touching keys displayed on the virtual keyboard 23 by the finger 12.

Although not shown in FIGS. 4A and 4B, it is also possible to construct in a manner such that a figure-input icon to input a Figure is prepared and when the icon is touched by the pen 11, for example, a "Figure input pad" window is opened and, when the icon is touched by the finger 12, for instance, a "figure selection pad" window is opened.

Processing Procedure

FIG. 5 is a flowchart for explaining the operation of the embodiment. The operation is executed by the processor 44 shown in FIG. 3.

The processor 44 requests an entry of the input coordinate values to the source discriminator 43 in step S1. When there is an entry, the source discriminator 43 sends the coordinate values and data indicative of either the pen-input or the finger-input to the processor 44. When there is no entry, the source discriminator 43 notifies the processor 44 of such a fact.

When there is no response input from the source discriminator 43 in step S2, the processor 44 returns to step S1. For simplicity of explanation, it is now assumed that when there is no entry, steps S1 and S2 are repeated. However, the apparatus is actually constructed in a manner such that when there is no entry, the processing routine is branched to other processes and after those processes or a part of them was executed, the processing routine is returned to step S1. When the input coordinate values are sent, in step S3, a check is made to see if the coordinate values exist in, for example, an input area of the character input icon 21. When the coordinate values are out of the input area, another process, for instance, the process corresponding to another icon is executed in step S4. After that, the processing routine is returned to step S1.

When the coordinate values in the input area of the character input icon 21 are inputted, the data indicative of either the pen-input data or the finger-input data is discriminated in step S5. In case of the pen-input, a pen-input process in step S6 is started. In case of the finger-input, a finger-input process in step S7 is started. After that, the processing routine is returned to step S1. Namely, when the pen-input process is started, the "CHR input pad" window 22 is displayed on the screen 13. When the finger-input process is started, the virtual keyboard 23 is displayed on the screen 13. The character inputting operations by the pen-input process and finger-input process are executed in processing step S4.

The data indicative of the pen-input or the finger-input can be also added to a part of the code indicative of the input coordinate values or a method of setting the data into a predetermined register of the source discriminator 43 or processor 44 or the like can be also used. It is sufficient to decide a proper method as an arbitrary selection item on design. Those processes can be assembled into the OS of the apparatus itself or can be also uniquely made correspond to each input on the application software side.

According to the embodiment as mentioned above, for example, processing form and display according to a touching method can be set into one icon such as a character input icon 21 or the like. Processing form and display according to a desired input method of the user can be performed. Therefore, an information processing apparatus of an excellent operability can be provided.

Modification

Although the construction such that the digitizer of the ultrasonic type is used for the pen-input and the touch panel of the resistive film type is used for the finger-input has been described above, the invention is not limited to such a construction. A digitizer of another type can be also used as a pen-input. Another proper device can be also similarly used as a touch panel. Further, it will be obviously understood that a similar effect is derived by any other input device capable of performing a pen-input and a finger-input so long as both of them can be discriminated.

Although the case of the pen-input and the finger-input has been described above, for instance, the invention can be also applied to a number of other input methods such as a pointing device of a pen, a finger, a mouse, or the like. For example, in case of combining the finger and the mouse, it is difficult to write a character by the mouse. Even in case of inputting a character by a mouse, it is convenient to use the virtual keyboard or the like. In case of inputting coordinates by using a plurality of input devices, by which device the coordinates were inputted is discriminated and the process and display according to the discrimination result are executed, so that the effect as mentioned above can be obtained.

Although the example in which the process and display according to the touching method of the character input icon are executed has been described above, the same shall also similarly apply to the case of selecting target operation and process from a menu.

Figure 6A:
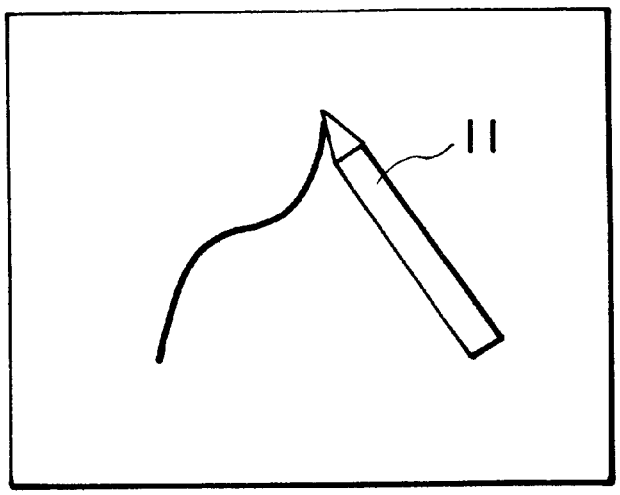
FIG. 6A is a diagram showing an example in which an operability is improved by executing a process according to an input device.
Figure 6B:
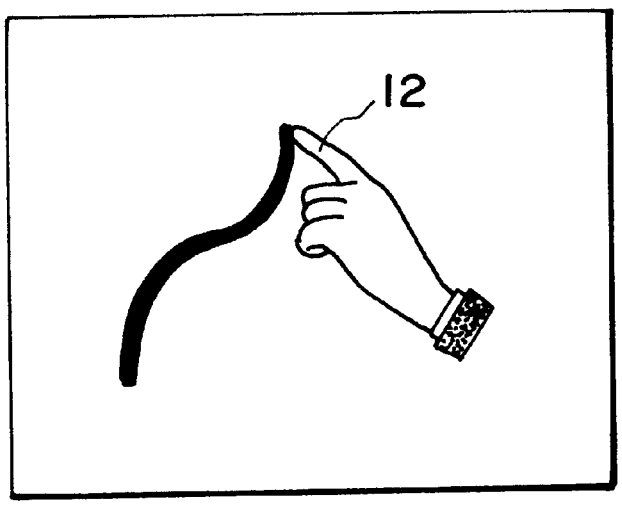
FIG. 6B is a diagram showing an example in which an operability is improved by executing a process according to an input device.

FIGS. 6A and 6B are diagrams showing an example in which an operability is improved by executing processes according to the input device. For example, in case of drawing a FIG. or picture by a pen-input computer or the like, a width of line to be drawn is ordinarily selected from a menu or the like is ordinarily selected. According to the invention, however, the input device is discriminated and an attribute such as a width of drawing line or the like can be switched in accordance with the discrimination result. For instance, by drawing a thin line in case of the pen-input as shown in FIG. 6A and by drawing a bold line in case of the finger-input as shown in FIG. 6B, a line according to a feeling of the user can be drawn. The pen-input can be also used to draw a line and the finger-input can be also treated as an eraser. By using a method whereby a line is drawn by the pen-input and is erased by a finger or the like, an input environment utilizing a feature of each input device can be set. An interface of a higher operability can be provided.

FIGS. 7A and 7B are diagrams showing another example in which the operability is improved by executing processes according to the input device. Namely, a fine operation is executed by the pen-input and a rough operation is executed by the finger-input. As shown in FIG. 7A, in a case such that a character is inputted by the pen 11, an operation (region selecting operation) such as to select those character regions is executed by the finger-input as shown in FIG. 7B.

In case of executing the region selecting operation, ordinarily, the input mode is switched to an editing mode and a region selection is performed. However, the finger-input is sufficient for the rough operation such as a region selection or the like. As a feeling of the user as well, it can be more easily recognized than the mode switching. If the editing operation can be performed by the finger-input in the input mode without switching the mode, by selecting the pen-inputted character region by the finger, the user can select the region without being aware of the mode change or the like.

An apparatus of a good operability in which the operation and process are distributed in accordance with the nature of the input device and information can be inputted without executing an operation such as a mode change or the like can be provided.

Another Embodiment

The invention can be applied to a system constructed by a plurality of equipment (for example, a host computer, an interface device, a reader, a printer, and the like) or can be also applied to an apparatus (for example, a copying apparatus, a facsimile apparatus, or the like) comprising one equipment.

It will be also obviously understood that the object of the invention is accomplished by a construction such that a storage medium in which program codes of software to realize the functions of the foregoing embodiments have been recorded is supplied to a system or an apparatus and a computer (or a CPU or an MPU) of the system or apparatus reads out and executes the program codes stored in the storage medium. In this case, the program codes themselves which were read out from the storage medium realize the functions of the foregoing embodiment and the storage medium in which the program codes have been stored construct the invention. As a storage medium for supplying the program codes, for example, it is possible to use a floppy disk, a hard disk, an optical disk, a magnetooptic disk, a CD-ROM, a CD-R, a magnetic tape, a non-volatile memory card, an ROM, or the like.

The invention is not limited to the case where the functions of the foregoing embodiments are realized by executing the read-out program codes by the computer. It will be obviously understood that the invention also incorporates a case where on the basis of instructions of the program codes, the OS or the like which are operating on the computer executes a part or all of the actual processes and the function of the foregoing embodiments are realized by the processes.

Further, it will be also obviously understood that the invention also incorporates a case where after the program codes read out from the storage medium were written into a memory equipped for a function expansion board inserted in the computer or a function expansion unit connected to the computer, the CPU or the like provided for the function expansion board or function expansion unit executes a part or all of the actual processes on the basis of the instructions of the program codes, and the functions of the foregoing embodiments are realized by the processes.

In case of applying the invention to the storage medium, the program codes corresponding to the flowchart described above are stored in the storage medium. However, when simply explaining, each module shown in a memory map example of FIG. 8 is stored into the storage medium. That is, it is sufficient that program codes of at least a "coordinate input module", an "input source discrimination module", a "process condition setting module", and a "processing module" are stored in the storage medium.

According to the invention as described above, an information processing apparatus and its method for distinguishing an input method and executing proper processes according to the distinguished input method can be provided.

What is claimed is:

1. An information processing apparatus comprising:
   first coordinate input means;
   second coordinate input means;
   selecting means for selecting an input type by determining whether an input was made by one of said first coordinate input means and said second coordinate input means or by both of said first coordinate input means and said second coordinate input means; and
   drawing means for determining a drawing attribute on the basis of the input type selected by said selecting means and drawing a line according to the determined drawing attribute.

2. An information processing apparatus according to claim 1, further comprising discriminating means for discriminating whether a coordinate value input by said first coordinate input means and/or said second coordinate input means exists inside a predetermined region of an input area.

3. An information processing apparatus according to claim 1, wherein said first coordinate input means is comprised of a pen input and said second coordinate input means is comprised of a touch panel.

4. An information processing apparatus according to claim 3, wherein said first coordinate input means and said second coordinate input means detect input coordinates by different methods.

5. An information processing apparatus according to claim 4, wherein said second coordinate input means detects the input coordinates by a change in resistance value.

6. An information processing apparatus according to claim 4, wherein said first coordinate input means detects the input coordinates by a transmission time of an acoustic wave.

7. An information processing apparatus comprising:
   first coordinate input means;
   second coordinate input means;
   selecting means for selecting an input type by determining whether an input was made by one of said first coordinate input means and said second coordinate input means or by both of said first coordinate input means and said second coordinate input means; and
   determining means for determining whether drawing processing or editing processing is performed for a coordinate value input by said first coordinate input means and/or said second coordinate input means on the basis of the input type selected by said selecting means.

8. An information processing apparatus according to claim 7, further comprising discriminating means for discriminating whether a coordinate value input by said first coordinate input means and/or said second coordinate input means exists inside a predetermined region of an input area.

9. An information processing apparatus according to claim 7, wherein said first coordinate input means is comprised of a pen input and said second coordinate input means is comprised of a touch panel.

10. An information processing apparatus according to claim 9, wherein said first and second input means detect input coordinates by different methods.

11. An information processing apparatus according to claim 10, wherein said second coordinate input means detects the input coordinates by a change in resistance value.

12. An information processing apparatus according to claim 10, wherein said first coordinate input means detects the input coordinates by a transmission time of an acoustic wave.

13. An information processing method for an information processing apparatus which includes first coordinate input means and second coordinate input means, said method comprising the steps of:
   selecting an input type by determining whether an input was made by one of the first coordinate input means and the second coordinate input means or by both of the first coordinate input means and the second coordinate input means; and
   determining a drawing attribute on the basis of the input type selected in said selecting step and drawing a line according to the determined drawing attribute.

14. An information processing method for an information processing apparatus which includes first coordinate input means and second coordinate input mean, said method comprising the steps of:
   selecting an input type by determining whether an input was made by one of the first coordinate input means and the second coordinate input means or by both of the first coordinate input means and the second coordinate input means; and
   determining whether drawing processing or editing processing is performed for a coordinate value input by the first coordinate input means and/or the second coordinate input means on the basis of the input type selected in said selecting step.

15. A computer-readable memory in which program codes for an information processing apparatus which includes first coordinate input means and second coordinate input means are stored, the program codes comprising:
   code for selecting an input type by determining whether an input was made by one of the first coordinate input means and the second coordinate input means or by both of the first coordinate input means and the second coordinate input means; and code for determining a drawing attribute on the basis of the input type selected in said selecting step and drawing a line according to the determined drawing attribute.

16. A computer-readable memory in which program codes for an information processing apparatus which includes first coordinate input means and second coordinate input mean are stored, the program codes comprising:

code for selecting an input type by determining whether an input was made by one of the first coordinate input means and the second coordinate input means or by both of the first coordinate input means and the second coordinate input means; and code for determining whether drawing processing or editing processing is performed for a coordinate value input by the first coordinate input means and/or the second coordinate input means on the basis of the input type selected in said selecting step.

* * * * *

UNITED STATES PATENT AND TRADEMARK OFFICE
CERTIFICATE OF CORRECTION

PATENT NO. : 6,611,258 B1
DATED : August 26, 2003
INVENTOR(S) : Atsushi Tanaka et al.

It is certified that error appears in the above-identified patent and that said Letters Patent is hereby corrected as shown below:

Column 3,
Line 49, "those values" should read -- values --.

Column 5,
Line 29, "made" should read -- made to --.

Column 8,
Line 47, "mean," should read -- means, --.

Column 9,
Line 7, "mean" should read -- means --.

Signed and Sealed this

Sixteenth Day of March, 2004

JON W. DUDAS
*Acting Director of the United States Patent and Trademark Office*